Figure 1:
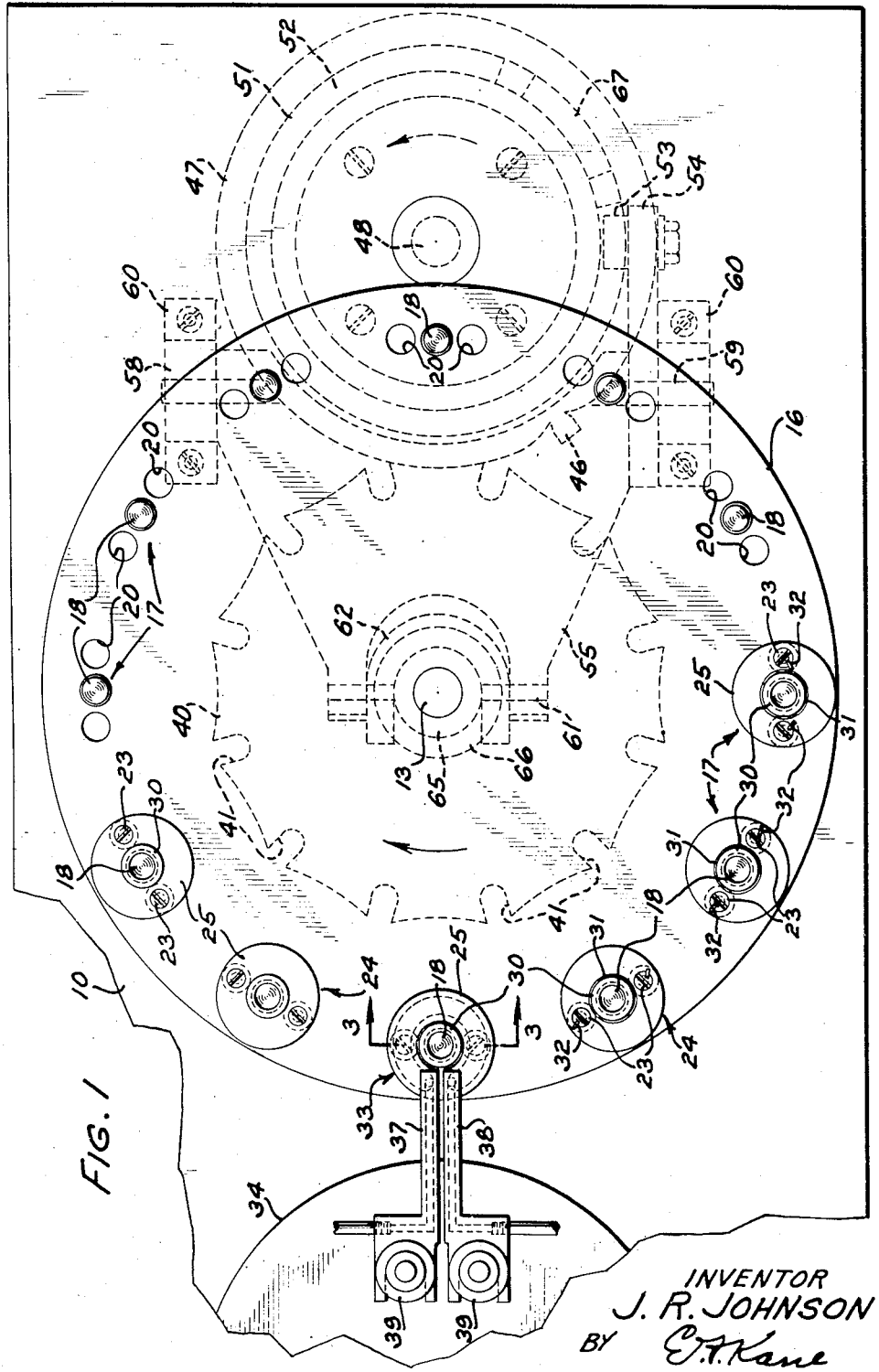

July 26, 1949.  J. R. JOHNSON  2,477,129
HIGH-FREQUENCY INDUCTION BRAZING APPARATUS
Filed Nov. 3, 1945  2 Sheets-Sheet 1

INVENTOR
J. R. JOHNSON
BY E. T. Kane
ATTORNEY

July 26, 1949.  J. R. JOHNSON  2,477,129
HIGH-FREQUENCY INDUCTION BRAZING APPARATUS
Filed Nov. 3, 1945  2 Sheets-Sheet 2
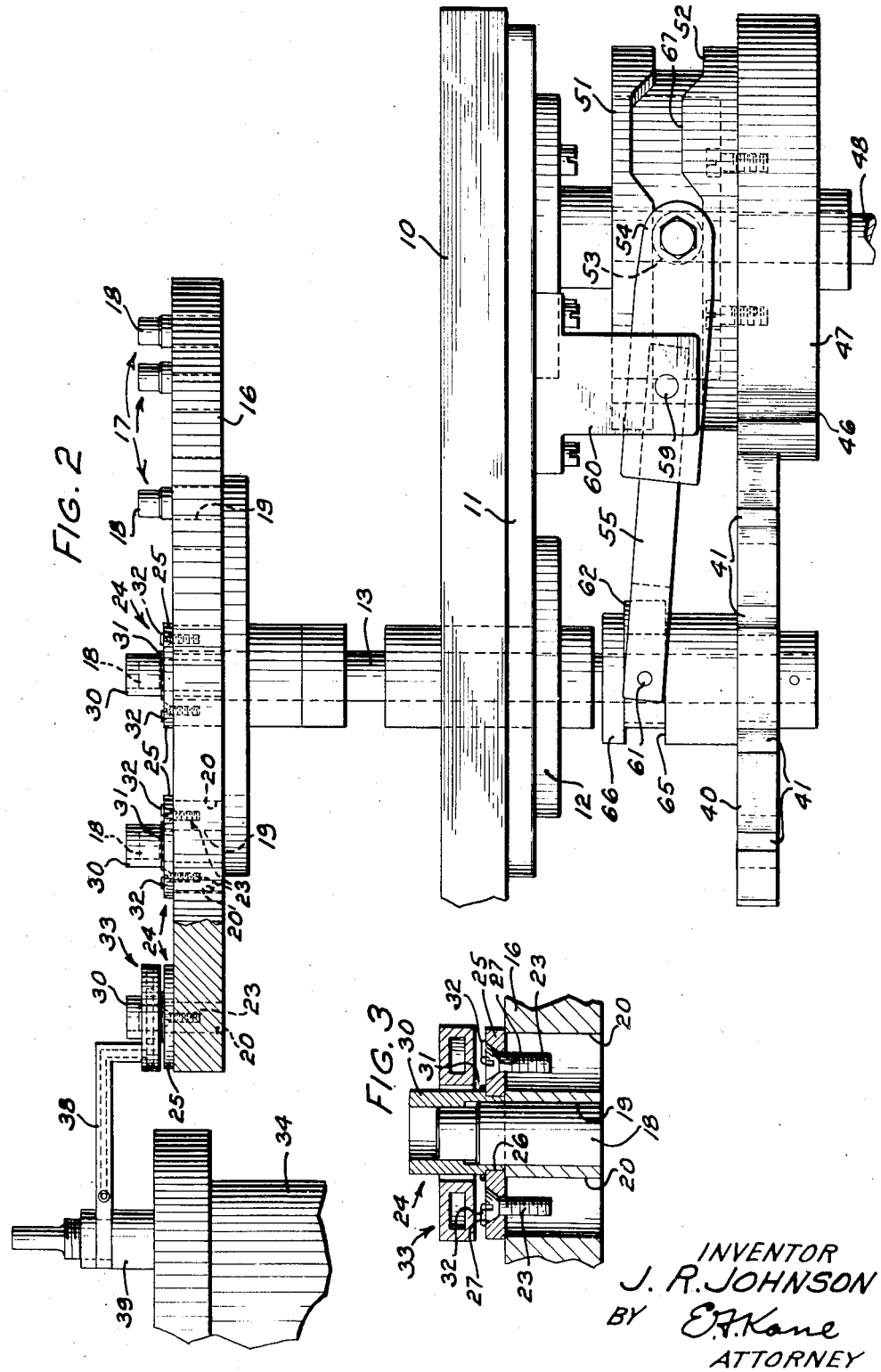
INVENTOR
J. R. JOHNSON
BY E. F. Kane
ATTORNEY Patented July 26, 1949

2,477,129

UNITED STATES PATENT OFFICE 2,477,129

HIGH-FREQUENCY INDUCTION BRAZING APPARATUS

Joel R. Johnson, Chicago, Ill., assignor to Western Electric Company, Incorporated, New York, N. Y., a corporation of New York Application November 3, 1945, Serial No. 626,561

2 Claims. (Cl. 219—47)

This invention relates to heating apparatus and more particularly to electrical high frequency induction brazing apparatus.

An object of this invention is the provision of a simple and practicable electrical high frequency induction brazing apparatus for efficiently and uniformly brazing article assemblages.

In accordance with the above object, the present invention, in one embodiment thereof as applied to the brazing of assemblages of parts of magnetron tubes wherein one of the parts extends an appreciable distance from its point of brazing to another part, comprises an intermittently rotatable and vertically reciprocatable table having circularly arranged equally spaced seats for supporting the assemblages to be brazed, which are successively indexed while in a lowered position into operative alignment with a stationary single turn high frequency induction heating coil, whereupon the table is elevated to carry the extending part of the aligned assemblage into the coil, where it remains for a predetermined period and a current is induced in the assemblage to heat it sufficiently to cause silver solder carried thereby to fuse and thus braze the parts together. Thereafter, the table is lowered to withdraw the brazed assemblage from operative association with the coil, whereupon successive assemblages are intermittently advanced and brazed by repeated cycles of operation as above described.

Other objects and advantages of this invention will more fully appear from the following detailed description, taken in conjunction with the accompanying drawings, in which Fig. 1 is a fragmentary plan view of an electrical high frequency induction brazing apparatus embodying the features of the invention;

Fig. 2 is a fragmentary side elevation, partly in section, of the apparatus shown in Fig. 1; and Fig. 3 is an enlarged detail vertical section, taken on the line 3—3 of Fig. 1.

Referring to the drawings in detail, a bench top or base 10 is provided, to the lower face of which is secured a plate 11 (Fig. 2) which, in turn, supports from its bottom face a hollow flanged bearing member 12 having its upper end extending through the plate and bench top. Rotatably and reciprocatably fitted in the fixed bearing member 12 is a vertical shaft 13, to the upper end of which is secured for movement therewith a work piece supporting and conveying table 16 of asbestos lumber, or other suitable material. The table 16, in the present embodiment, has twelve equally spaced circularly arranged work supporting positions 17 concentric with its axis of rotation, each comprising a shouldered stud or pin 18 (Fig. 3), circular in cross-section, of fired lava and having its larger diameter drive-fitted into an aperture 19 in the table, the upper smaller diameter of the pin, as well as a portion of the larger diameter thereof, extending for a suitable distance above the table. Formed in the table 16 at each side of the pin 18, and diametrically opposed with respect thereto, are two clearance apertures 20 for receiving a pair of screws 23 included in an assemblage 24 of parts to be brazed together.

The assemblage 24 comprises a ring or mounting plate 25 having a central aperture 26 (Fig. 3) and two countersunk apertures 27, one at each side of the central aperture, for receiving the screws 23, the apertures 26 and 27 being arranged on centers corresponding to those of the apertures 19 and 20, respectively, provided in the table 16. Fitted in the central aperture 26 of the plate 25 is a lower shouldered end of a tube 30 having its lower edge lying in the plane of the bottom face of the plate 25, the plate resting upon the upper face of the table 16. The inner diameter of the tube 30 is shouldered, thus providing a larger and a small diameter in which the larger and smaller diameters of the pin 18 freely fits when the mounting plate 25 and tube 30 are mounted in position thereon at the loading position, which may be the lowermost position 17, as viewed in Fig. 1. A ring-shaped piece of silver solder 31 is placed on the assemblage 24 surrounding the juncture of the upper face of the mounting plate 25 and the outer periphery of the tube 30 and short lengths 32 of such solder are also placed in position at the junctures of the apertures 27 in the mounting plate and the outer peripheries of the screws 23 upon their upper faces, the solder being fused during the brazing operation to unite the parts of the assemblage.

At one position of the intermittently rotatable and reciprocatable table 16, a single turn high frequency induction heating coil 33 is fixedly supported above the table in such position that the vertical axis of an assemblage 24 to be brazed at the termination of each intermittent rotary movement of the table is aligned with the vertical axis of the coil, the hollow of the coil being of such dimension that the tube 30 of the assemblage will freely enter thereinto when the table is elevated to the position shown in Figs. 2 and 3. In this latter position of the assemblage 24, the tube 30, mounting plate 25 and the screws 23 and the pieces of solder 31 and 32, comprising the assemblage 24, will have a current induced therein from the high frequency coil sufficient to cause the pieces of silver solder 31 and 32 to fuse and thus braze the parts together. The coil 10 is electrically connected to a source of high frequency current 34 by means of a pair of leads 37 and 38, each having one end connected to the coil and their opposite ends secured to terminals 39 of the source of high frquency current 34. A more complete disclosure herein of the single turn high frequency induction heating coil 10 is not believed necessary to a complete understanding of the present invention. For a more complete disclosure of a coil of the general type referred to herein, reference may be had to the co-pending application of R. J. Detuno, Serial No. 619,129, filed September 28, 1945.

The work piece supporting and conveying table 16 is rotated intermittently in a clockwise direction, as indicated by the arrow on Fig. 1, while in a lowered position, to align, in succession, the assemblages 24 of parts seated on the table under the high frequency heating coil 33 and then is elevated to the position shown in Figs. 2 and 3, where it remains for a predetermined period of time to effect the brazing operation and is then lowered to permit, in the following intermittent rotation, the alignment of the next assemblage 24 with the coil 33 by the mechanism described hereinafter.

Fixed to the lower end of the rotatable and reciprocatable shaft 13 is a driven disk 40, of a Geneva motion mechanism, having twelve equally spaced radially directed peripheral slots 41. The disk 40 is intermittently driven by a single actuator or tooth 46, engageable in the disk slots 41, and carried by a driving disk 47 fixed to a continuously rotating shaft 48, which may be operatively connected at its lower end, shown fragmentarily, to an output shaft of a speed reducing mechanism driven from a suitable source of power (not shown). For each complete counterclockwise rotation of the shaft 48 and the disk 47 carried thereby, as indicated by the arrow (Fig. 1), one edge of one of the slots 41 of the disk 40, fixed to the shaft 13, is engaged by the tooth 46 of the disk 47 and thus the disk 40 is indexed one position and, consequently, the table 16, carrying the assemblages 24 of parts, also fixed to the shaft 12, is similarly indexed, thus accurately aligning an assemblage 24 under the high frequency heating coil 33.

Secured to the upper face of the continuously rotating disk 47 (Fig. 2) is a cam disk 51 having an annular cam groove 52 with which a cam roller 53 cooperates, the cam roller being rotatable on the outer end of an arm 54 of an irregularly shaped lever 55 pivoted at 58 and 59 to spaced brackets 60 (Fig. 1) depending from and fixed to the bottom face of the plate 11. The end of the lever 55 opposite the arm 54 is bifurcated and pivoted at 61 between the furcations thereof is a U-shaped shifting member 62, having its opposite parallel arms operatively engaged in an annular channel 65 of a sleeve 66 secured to the rotatable and reciprocatable shaft 13. Formed in the cam groove 52 of the cam disk 51 is a cam rise 67 of suitable length, up and onto which the roller 53 rides during each complete rotation of the cam disk.

This movement of the roller 53 onto the cam rise 67 in the operation of the apparatus effects a counterclockwise movement of the lever 55 about its pivots 58 and 59 (Fig. 2) and through its operative connections with the rotatable and reciprocatable shaft 13, previously described, supporting the table 16, the latter is lowered from its raised position, shown in Figs. 1, 2 and 3, wherein an assemblage 24 of parts is entered in the heating coil 33. As the shaft 13 is lowered, the slotted disk 40 also is lowered, but since the peripheral face of the disk 47 and the tooth 46 thereon is greater in width than that of the slotted disk, the disks are at all times in operative peripheral engagement. In timed relation with the lowering of the table 16, the tooth 46 of the continuously rotating disk 47 operatively engages one edge of a slot 41 of the lowered disk 40, whereupon the disk 40 and the table 16 is indexed one position in a clockwise direction (Fig. 1) to align the next assemblage 24 of parts under the heating coil 33. In timed relation to the completion of the indexing movement of the table 16, which is completed when the tooth 46 is disengaged from the slot 41, the roller 53 rides down the cam rise 67, thus causing the lever 55 to be rocked in a clockwise direction and, through the operative connections previously described, the table 16 is raised to the position shown in Figs. 1, 2 and 3 to enter the aligned assemblage 24 in the stationary heating coil 33, where it remains for a predetermined period to complete the brazing operation. Thus, during each complete rotation of the driving disk 47 and the cam disk 51, secured thereto, the assemblages 24 of parts seated on the table 16, at the positions 17, are successively aligned under the heating coil 33, the assemblage then being raised to enter the coil, where it remains for a predetermined period of time to complete the brazing operation, after which it is lowered for the next indexing operation and the cycle is then repeated.

What is claimed is:

1. In an apparatus for intermittently conveying articles to be treated to a high frequency induction heating coil, a rotary article supporting table, a rotatably and reciprocably mounted shaft for supporting said table, the coil being positioned to extend radially inwardly of the table, means for intermittently indexing the shaft and table to align articles supported on the table with the coil, means for reciprocating the table supporting shaft to carry an article aligned with the coil into operative relation to the coil, said shaft reciprocating means including a cam and a pivotal lever, said lever being operatively related at one end with said cam and at its opposite end with said reciprocable shaft for actuating said latter shaft, an actuator for operating the indexing means, and a drive shaft common to the indexing actuator and said cam of the reciprocating means for operating them in timed relation one to another.

2. In an apparatus for intermittently conveying articles to be treated to a high frequency induction heating coil, a rotary article supporting table, a rotatably and reciprocably mounted shaft for supporting said table, the coil being positioned to extend radially inwardly of the table, means for intermittently indexing the shaft and table to align articles supported on the table with the coil, a drive shaft, means for reciprocating the table supporting shaft to carry an article aligned with the coil into operative relation to the coil, said shaft reciprocating means including a cam carried by said drive shaft and a pivotal lever operatively related at one end with said cam and at its opposite end with said reciprocable shaft for actuating said latter shaft, and an actuator carried by said drive shaft for operating the indexing means.

JOEL R. JOHNSON.

REFERENCES CITED

The following references are of record in the file of this patent:

UNITED STATES PATENTS

| Number | Name | Date |
|---|---|---|
| 995,509 | White | June 20, 1911 |
| 1,804,637 | Morrow | May 12, 1931 |
| 2,177,299 | Fredrickson | Oct. 24, 1939 |
| 2,182,799 | Farr | Dec. 12, 1939 |
| 2,239,385 | Harder | Apr. 22, 1941 |
| 2,279,371 | Gordon | Apr. 14, 1942 |
| 2,351,392 | Biner | June 13, 1944 |
| 2,361,517 | White et al. | Oct. 31, 1944 |

OTHER REFERENCES

"High-Frequency Induction Heating," by Curtis; published 1944 by McGraw-Hill Book Co.; pp. 173, 180. (Copy in Div. 60.)